United States Patent
Yu et al.

(10) Patent No.: US 9,219,808 B2
(45) Date of Patent: Dec. 22, 2015

(54) CONTACT INFORMATION SYNCHRONIZATION SYSTEM AND METHOD

(71) Applicant: TENCENT TECHNOLOGY (SHENZHEN) COMPANY LIMITED, Shenzhen (CN)

(72) Inventors: Shuangquan Yu, Shenzhen (CN); Guanghai Wen, Shenzhen (CN); Haoyu Xiao, Shenzhen (CN); Baohua Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 5 days.

(21) Appl. No.: 14/102,529

(22) Filed: Dec. 11, 2013

(65) Prior Publication Data

US 2014/0099930 A1    Apr. 10, 2014

Related U.S. Application Data

(63) Continuation of application No. PCT/CN2012/080511, filed on Aug. 23, 2012.

(30) Foreign Application Priority Data

Oct. 21, 2011    (CN) .......................... 2011 1 0322436

(51) Int. Cl.
*H04M 3/42*    (2006.01)
*H04M 1/2745*    (2006.01)
(Continued)

(52) U.S. Cl.
CPC ... *H04M 1/274516* (2013.01); *G06F 17/30575* (2013.01); *H04M 3/4931* (2013.01)

(58) Field of Classification Search
CPC .................... H04M 1/274516; H04L 67/1095; H04L 61/1594
See application file for complete search history.

(56) References Cited

U.S. PATENT DOCUMENTS

2006/0242210 A1*  10/2006  Ring et al. ..................... 707/204
2010/0211634 A1*  8/2010  Song et al. ..................... 709/203
(Continued)

FOREIGN PATENT DOCUMENTS

| CN | 1700711 A | 11/2005 |
|---|---|---|
| CN | 101068156 A | 11/2007 |

(Continued)

OTHER PUBLICATIONS

The World Intellectual Property Organization (WIPO) International Search Report for PCT/CN2012/080511 Nov. 29, 2012.
(Continued)

*Primary Examiner* — Khalid Shaheed
(74) *Attorney, Agent, or Firm* — Anova Law Group, PLLC (57) ABSTRACT

A method for synchronizing between a first address book on a user terminal and a second address book on an SNS network includes determining a synchronization target and, when the synchronization target is determined as the first address book, downloading contact information from the second address book to the user terminal. The method also includes, when the synchronization target is determined as the second address book, uploading contact information from the first address book to the SNS network, and matching the contact information in the first address book against the contact information in the second address book. Further, the method includes identifying a contact person having same contact information based on the matching and synchronizing information of the contact person in the first address book and information of the contact person in the second address book.

2 Claims, 6 Drawing Sheets

(51) Int. Cl.
*H04M 3/493* (2006.01)
*G06F 17/30* (2006.01)

(56) References Cited

U.S. PATENT DOCUMENTS

2011/0106889 A1* 5/2011 Scott et al. .................... 709/206
2013/0022284 A1* 1/2013 Zheng .......................... 382/229

FOREIGN PATENT DOCUMENTS

| CN | 101710921 A | 5/2010 |
|---|---|---|
| CN | 102104650 A | 6/2011 |
| WO | 2009100328 A1 | 8/2009 |

OTHER PUBLICATIONS

The State Intellectual Property Office of the People's Republic of China (SIPO) Office Action 1 for 201110322436.9 Sep. 6, 2015.

* cited by examiner

CONTACT INFORMATION SYNCHRONIZATION SYSTEM AND METHOD

CROSS-REFERENCES TO RELATED APPLICATIONS

This application is a continuation of PCT Patent Application No. PCT/CN2012/080511, filed on Aug. 23, 2012, which claims the priority of Chinese patent application no. 201110322436.9, filed on Oct. 21, 2011, the entire contents of all of which are incorporated herein by reference.

FIELD OF THE INVENTION

The present invention generally relates to the field of Internet technology and, more particularly, to systems and methods for information synchronization between user terminals and social network service (SNS) networks.

BACKGROUND

With rapid development on the social network services (SNS), many users of the SNS gradually formed a relationship chain in real names within the online SNS community. On the other hand, the users often also maintain address books with real names on their mobile terminals. Therefore, a user needs to separately manage an address book on the mobile terminal and an address book on the SNS network. Such separate-platform management model may have low efficiency and high management costs, and may be unable to provide desired user experience to the users.

Solutions need to be provided on how to correlate and integrate information in the address book on the mobile terminal and information in the address book on the SNS network. The disclosed methods and systems are directed to solve one or more problems set forth above and other problems.

BRIEF SUMMARY OF THE DISCLOSURE

One aspect of the present disclosure includes a method for synchronizing between a first address book on a user terminal and a second address book on an SNS network. The method includes determining a synchronization target, downloading contact information from the second address book to the user terminal when the synchronization target is determined as the first address book, and uploading contact information from the first address book to the SNS network when the synchronization target is determined as the SNS network address book. The method also includes matching contact information in the first address book against contact information in the second address book, identifying, based on the matching, a contact person having same contact information in the first address book and the second address book, and, after the contact person is identified, synchronizing information of the contact person in the first address book and information of the contact person in the second network address book.

Another aspect of the present disclosure includes a user terminal. The user terminal includes a storing module, a matching module, an identifying module, and a synchronization module. The storing module is configured to store a terminal address book, and the matching module is configured to match contact information in the terminal address book against contact information in the SNS network address book. Further, the identifying module is configured to identify a contact person having same contact information based on a matching result from the matching module, and the synchronizing module is configured to, after the contact person is identified by the identifying module, synchronize information of the contact person in the terminal address book and information of the contact person in the SNS network address book.

Another aspect of the present disclosure includes a social network service (SNS) network server. The SNS server includes a storing module, a matching module, an identifying module, and a synchronization module. The storing module is configured to store an SNS network address book, and the matching module is configured to match contact information in the SNS network address book against contact information in the terminal address book. Further, the identifying module is configured to identify a contact person having same contact information based on a matching result from the matching module. The synchronizing module is configured to, after the contact person is identified by the identifying module, synchronize information of the contact person in the SNS network address book and information of the contact person in the terminal address book.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 8:
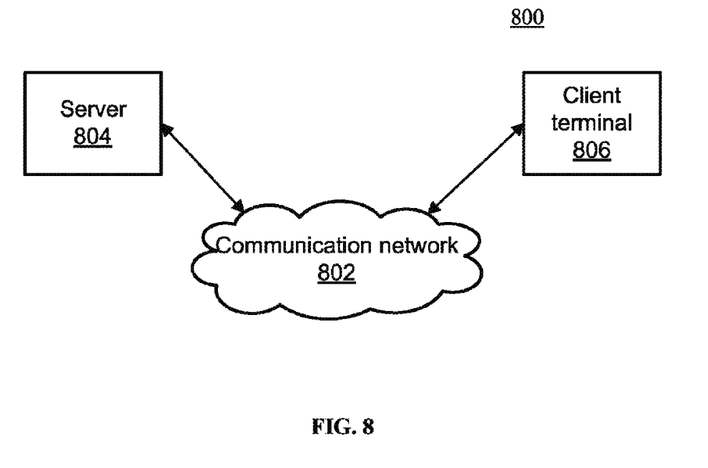
FIG. 8 illustrates an exemplary environment incorporating certain embodiments of the present invention.

FIG. 8 illustrates an exemplary environment 800 incorporating certain disclosed embodiments of the present invention. As shown in FIG. 8, environment 800 may include a server 804, a client terminal 806, and a communication network 802. The server 804 and the client terminal 806 may be coupled through the communication network 802 for information exchange, such as social network services (SNS) and other internet portals and online communities. Although only one client terminal 806 and one server 804 is shown in the environment 800, any number of client terminals 806 or servers 804 may be included, and other devices may also be included.

Communication network 802 may include any appropriate type of communication network for providing network connections to the server 804 and client terminal 806 or among multiple servers 804 or client terminals 806. For example, communication network 802 may include the Internet or other types of computer networks or telecommunication networks, either wired or wireless.

A client terminal, as used herein, may refer to any appropriate user terminal with certain computing capabilities, such as a personal computer (PC), a work station computer, a server computer, a hand-held computing device (tablet), a smart phone or mobile phone, or any other user-side computing device.

A server, as used herein, may refer one or more server computers configured to provide certain server functionalities related to providing SNS, such as database management, SNS data management, and other data access and management functions. A server may also include one or more processors to execute computer programs in parallel.

Figure 7:
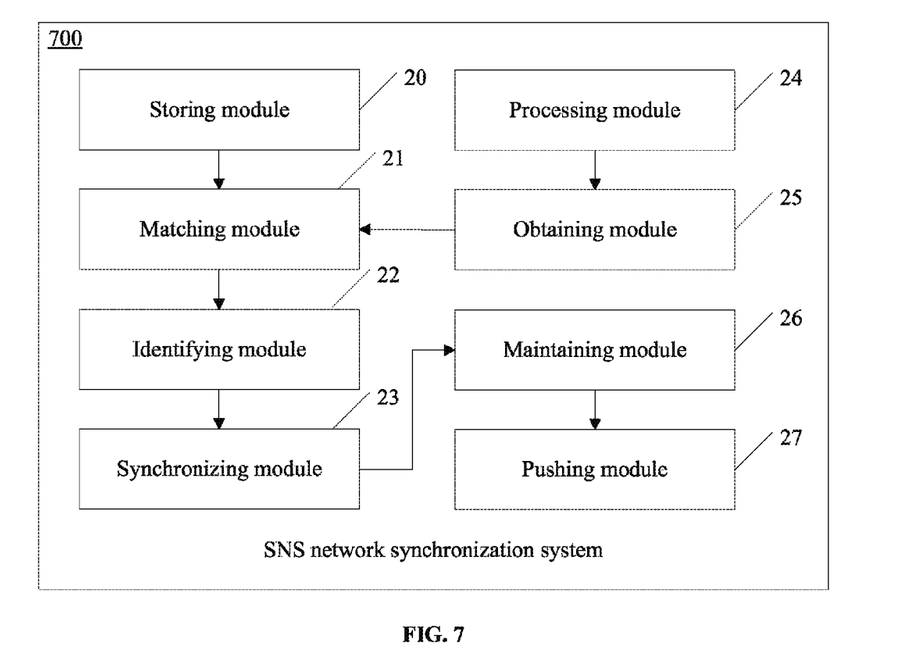
FIG. 7 illustrates another exemplary SNS network synchronization system consistent with the disclosed embodiments.
Figure 9:
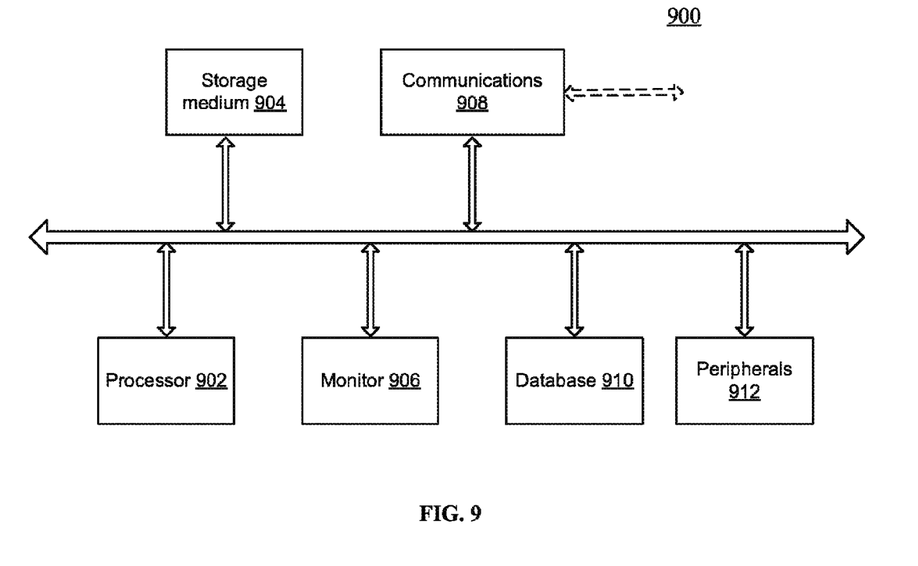
FIG. 9 illustrates an exemplary computing system consistent with the disclosed embodiments.

Server 804 and/or client terminal 806 may be implemented on any appropriate type of computing platform. FIG. 7 shows a block diagram of an exemplary computing system 900 that may be used to implement server 804 and/or client terminal 806.

As shown in FIG. 9, computing system 900 may include a processor 902, a storage medium 904, a monitor 906, a communication module 908, a database 910, peripherals 912, and one or more bus 914 to couple the devices together. Certain devices may be omitted and other devices may be included.

Processor 902 may include any appropriate processor or processors. Further, processor 902 can include multiple cores for multi-thread or parallel processing. Storage medium 904 may include memory modules, such as ROM, RAM, and flash memory modules, and mass storages, such as CD-ROM, U-disk, removable hard disk, etc. Storage medium 904 may store computer programs for implementing various processes, when executed by processor 902.

Further, peripherals 912 may include I/O devices such as keyboard and mouse, and communication module 908 may include network devices for establishing connections through the communication network 802. Database 910 may include one or more databases for storing certain data and for performing certain operations on the stored data, such as database searching.

Figure 1:
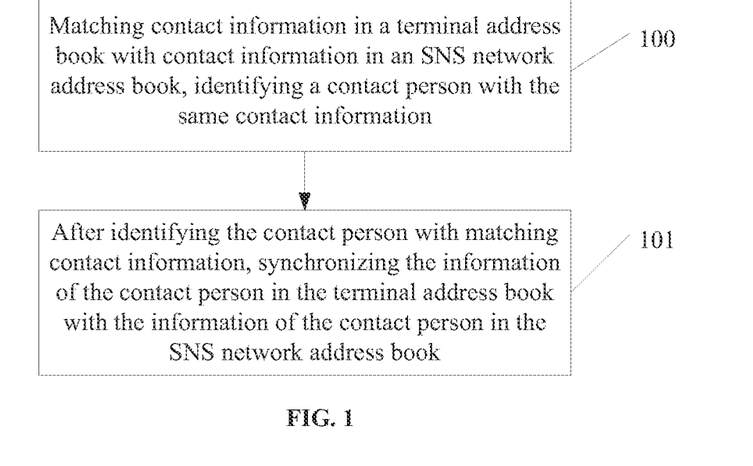
FIG. 1 illustrates an exemplary address book information synchronization process consistent with the disclosed embodiments.

In operation, a user at client terminal 806 may access an SNS network provided and/or managed by server 804 to perform certain information management actions, such as synchronizing information in address books on client terminal 806 and information in address books on the SNS network or server 804. FIG. 1 illustrates an exemplary address book synchronization process consistent with the disclosed embodiments.

A user on the client terminal 806 may have an address book located on client terminal 806, i.e., a terminal address book, for storing information of persons the user have contact with. The user may also have an address book located on the SNS network on server 804, i.e., an SNS network address book, for storing all information of persons the user has a relationship related to the SNS network. The user may request client terminal 806 and/or server 804 to synchronize the information stored in the different address books.

To synchronize between the terminal address book and the SNS network address book, a synchronization target (an address book to which information is synchronized) may be determined. For example, the user may input a desired synchronization target. Alternatively, client terminal 806 and/or server 804 may automatically determine which one of the terminal address book and the SNS network address book is the synchronization target.

As shown in FIG. 1, after receiving a request from the user, client terminal 806 and/or server 804 may match contact information in the terminal address book with contact information in the SNS network address book to identify a contact person with the same contact information in the terminal address book and in the SNS network address book (100).

The contact information is a part of the information about a contact person stored in the terminal address book and in the SNS network address book. The contact information may be used to represent or identify the contact person and may include any appropriate information entry in an address book. In certain embodiments, the contact information may include a mobile phone number and/or an email address. Other unique identification information of a contact person used in the address book may also be used. The mobile phone number or email address is generally more effective as an identifier of a contact person than other information in the address book. Matching the mobile phone number and/or email address may produce desired matching result.

Further, after a contact person with matching contact information is identified (100), the information of this contact person in the terminal address book is synchronized with the information of the same contact person in the SNS address book (101). That is, by matching a specific type or types of information (i.e., contact information) in the terminal address book with the specific type or types of information in the SNS network address book, all information of the contact person with matching contact information separately stored on the client terminal 806 and on the SNS network can be synchronized. Thus, the address book on the SNS network and the address book on the client terminal 806 can be interoperable and these address books can also be managed in one-stop fashion. Thus, the user can manage address book information with improved efficiency.

Figure 4:
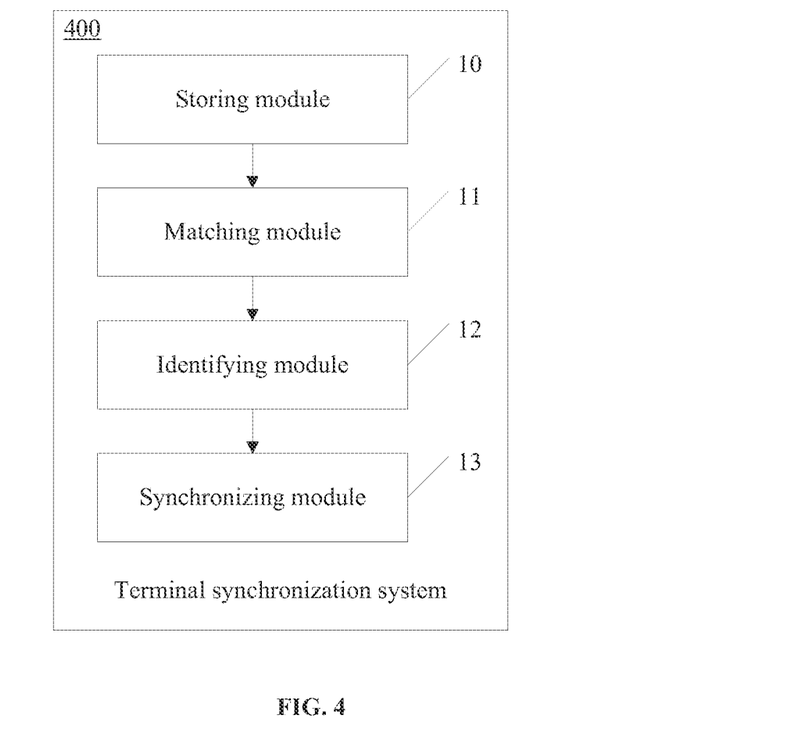
FIG. 4 illustrates an exemplary terminal synchronization system consistent with the disclosed embodiments.

To provide these functionalities, certain synchronization systems may be implemented on both client terminal 806 and server 804 via software, hardware, or a combination of software and hardware. FIG. 4 illustrates an exemplary terminal synchronization system 400 implemented on client terminal 806 consistent with the disclosed embodiments.

As shown in FIG. 4, the terminal synchronization system 400 includes a storing module 10, a matching module 11, an identifying module 12, and a synchronizing module 13. Other modules may also be included.

Storing module 10 may be configured to store an address book on client terminal 806 (i.e., a terminal address book) and also to store associated entries of information in the address book. One or more entries of information may be designated as contact information. Matching module 11 is configured to match the contact information in the terminal address book with contact information in the SNS network address book. Identifying module 12 is configured to identify a contact person having same contact information in the terminal address book based on the matching results from the matching module 11. Identification module 12 may identify all contact persons having matching contact information in the terminal address book.

Further, synchronization module 13 is configured to, after the identifying module 12 identifies the contact person having the same certain contact information, synchronize information of the contact person stored in the terminal address book with all the information of the contact person stored in the SNS network address book. More specifically, the synchronization module 13 synchronizes the information of the contact person in the SNS network address book to the information of the contact person in the terminal address book as a new addition. That is, the information of the contact person stored in the SNS network address book is added to the information of the contact person stored in the terminal address book.

After adding all information of the identified contact persons to the terminal address book, synchronization module 13 may obtain the information of remaining contact persons in the SNS network address book. The remaining contact persons in the SNS network address book are those contact persons filtered out in the above identification process, i.e., the contact persons having different contact information from the contact persons in the terminal address book. For the remaining contact persons in the SNS network address book without any matching contact information but with a mobile phone number or an email address, a list of those contact persons together with their information may be displayed to the user. And the user may be prompted to add any of the listed contact persons as a new contact to the terminal address book. The user may also be prompted to download the information of the newly added person from the SNS network to the terminal address book.

The information of a contact person may include one or more of name, picture, mobile phone number, email address, telephone number, friend's personal home page Uniform Resource Locator (URL), residence address, company name, birthday, job title, and Instant Messaging (IM) information. As previously described, the information in the SNS network address book may include various types of information. For example, the information may include contact information, such as one or more mobile phone number, email address, and telephone number, and other information, such as birthday and residence address. The mobile phone number or email address is generally a more effective identifier of a contact person than other information in the address book. Matching the mobile phone number or email address may produce desired matching result.

Figure 5:
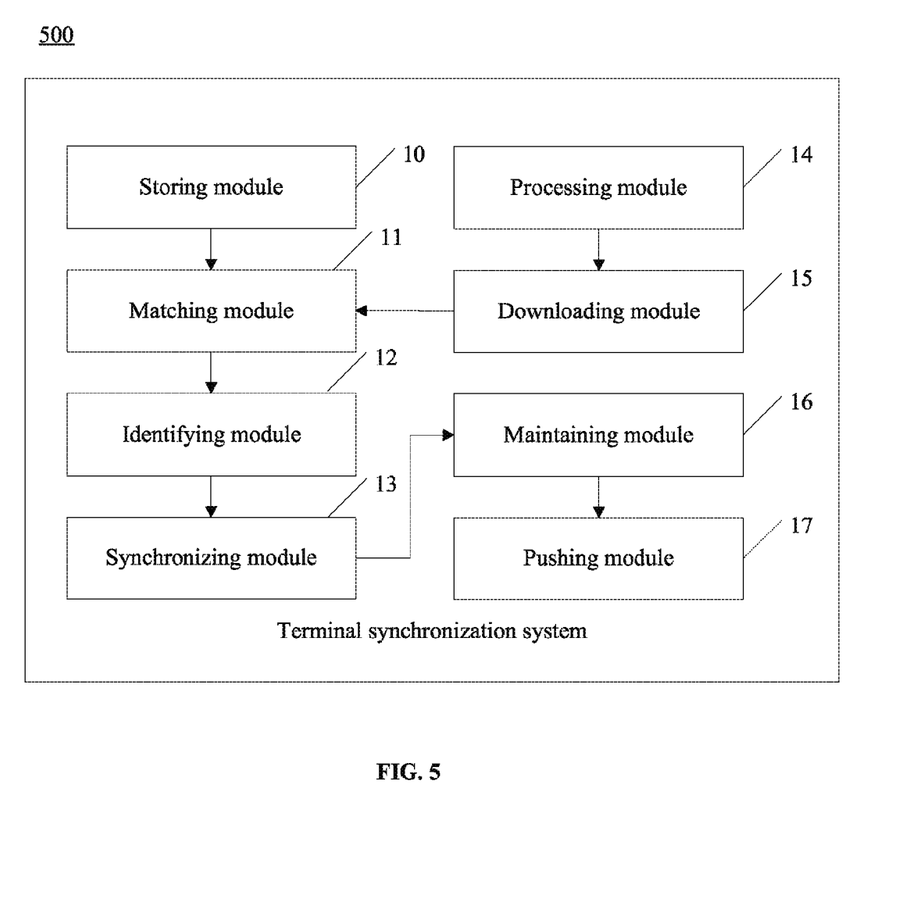
FIG. 5 illustrates another exemplary terminal synchronization system consistent with the disclosed embodiments.

FIG. 5 illustrates another exemplary terminal synchronization system 500 implemented on client terminal 806 consistent with the disclosed embodiments. As shown in FIG. 5, the terminal synchronization system 500 includes storing module 10, matching module 11, identifying module 12, synchronizing module 13, processing module 14, downloading module 15, maintaining module 16, and pushing module 17. Certain modules may be omitted and other modules may also be included.

Because storing module 10, matching module 11, identifying module 12, and synchronizing module 13 are described with respect to FIG. 4 above, detailed descriptions are omitted herein. Further, processing module 14 is configured to process contact information downloaded from the SNS network address book such that the contact information is represented in a specific format. Downloading module 15 is configured to download contact information in the SNS network address to the client terminal 806 and/or to download information in the SNS network address book to the client terminal 806.

More specifically, when the user initiates a synchronization operation to synchronize the terminal address book and the SNS network address book or to synchronize the information of a contact person in the SNS network address book to the terminal address book, a client-side program may cause the SNS network (e.g., server 804) to call certain system interfaces to read the contact information in the user's SNS network address book. The processing module 14 may then download the contact information, such as mobile phone number and email address, to the client terminal 806 via the downloading module 15. After receiving the contact information, the processing module 14 may standardize the format of the contact information, which may be in different formats. The format of the contact information may be standardized such that the matching module 11 can match the standardized contact information with the contact information in the terminal address book. The standardized format may be a format recognized by the client terminal 806 or by a format specified by an SNS network operator.

As described above, the matching module 11 may match the downloaded and standardized contact information with contact information in the terminal address book and, based on the matching results, the identifying module 12 identifies the contact person with matching contact information. The identifying module 12 may identify all contact persons having matching contact information in the terminal address book. The synchronizing module 13 adds the information of the identified contact person in the SNS network address book to the information of the contact person in the terminal address book. After adding all information of the identified contact persons to the terminal address book, synchronization module 13 may obtain the information of the remaining contact persons in the SNS network address book and may prompt the user with a list of those remaining contact persons together with their information. The user may be prompted to add any of the listed contact persons as a new contact to the terminal address book. The user may also be prompted to download the information of the newly added person from the SNS network to the terminal address book.

The maintaining module 16 is configured to maintain the terminal address book. For example, the maintaining module 16 may be configured to perform certain maintenance actions when receiving instructions from the user. When receiving a user instruction for a modification operation, the maintaining module 16 modifies the newly added (or synchronized) information of the contact person and stores the modified information in the terminal address book. When receiving a user instruction for a deletion operation, the maintaining module 16 deletes the newly added information that is not modified from the terminal address book, while keeping the original information of the contact person or the newly added but modified information in the terminal address book. Further, the pushing module 17 is configured to, when the information of the contact person is changed in the terminal address book, push the changes of the information of the contact person to the SNS network address book.

Figure 6:
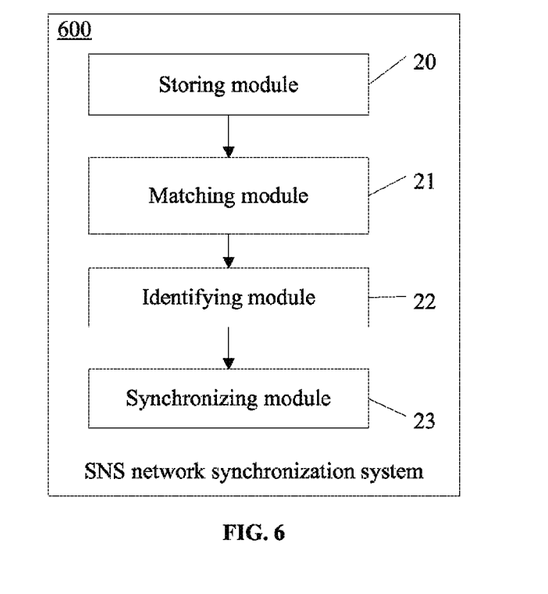
FIG. 6 illustrates an exemplary SNS network synchronization system consistent with the disclosed embodiments.

FIG. 6 illustrates an exemplary SNS network synchronization system 600 implemented on server 804 consistent with the disclosed embodiments. As shown in FIG. 6, the SNS network synchronization system 600 includes a storing module 20, a matching module 21, an identifying module 22, and a synchronizing module 23. Other modules may also be included.

Storing module 20 may be configured to store an address book on server 804 (i.e., an SNS network address book) and also to store associated entries of information in the SNS network address book. Matching module 21 is configured to match the contact information in the SNS network address book with contact information in the terminal address book.

Identifying module 22 is configured to identify a contact person having same contact information in the SNS network address book based on the matching results from the matching module 21.

Further, synchronization module 23 is configured to, after the identifying module 22 identifies the contact person having the same contact information, synchronize all information of the contact person stored in the SNS network address book with the information of the contact person stored in the terminal address book. More specifically, the synchronization module 23 synchronizes the information of the contact person in the terminal address book to the information of the contact person in the SNS network address book as a new addition. That is, all the information of the contact person stored in the terminal address book is added to the information of the contact person stored in the SNS network address book.

After adding information of all contact persons having matching contact information in the SNS network address book, synchronization module 23 may obtain the information of the remaining contact persons in the terminal address book and may prompt the user with a list of those contact persons together with their information. The user may be prompted to add any of the listed contact persons as a new contact to the SNS network address book. The user may also be prompted to upload the information of the newly added person from the terminal to the SNS network address book.

FIG. 7 illustrates another exemplary SNS network synchronization system 700 implemented on server 804 consistent with the disclosed embodiments. As shown in FIG. 7, the SNS network synchronization system 700 includes storing module 20, matching module 21, identifying module 22, synchronizing module 23, processing module 24, obtaining module 25, maintaining module 26, and pushing module 27. Certain modules may be omitted and other modules may also be included.

Because storing module 20, matching module 21, identifying module 22, and synchronizing module 23 are described with respect to FIG. 6 above, detailed descriptions are omitted herein. Further, processing module 24 is configured to process contact information obtained from the terminal address book such that the contact information is represented in a specific format. Obtaining module 25 is configured to obtain contact information from the client terminal 806 to server 804 and also to obtain other information in the terminal address book from the client terminal 806.

More specifically, when synchronizing the information of a contact person in the terminal address book to the SNS network address book, the processing module 24 may call certain system interfaces to read the contact information in the user's terminal address book. The synchronization may be initiated by the user or may be initiated by the server 804 automatically upon certain conditions. The processing module 24 may obtain the contact information, such as mobile phone number and/or email address, and send the contact information to the SNS network (e.g., server 804). Further, the processing module 24 may standardize the format of the contact information, which may be in different formats, such that the matching module 21 can match the standardized contact information with the contact information in the SNS network address book. The standardized format may be a format recognized by the server 804 or by a format specified by an SNS network operator.

As described above, the matching module 21 may match the obtained and standardized contact information with contact information in the SNS network address book and, based on the matching results, the identifying module 22 identifies the contact person with matching contact information. The synchronizing module 23 then adds the information of the contact person in the terminal address book to the information of the contact person in the SNS network address book.

After adding information of all identified contact persons having matching contact information in the SNS network address book, synchronization module 23 may obtain the information of the remaining contact persons in the terminal address book and may prompt the user with a list of those contact persons together with their information. The user may be prompted to add any of the listed contact persons as a new contact to the SNS network address book. The user may also be prompted to upload the information of the newly added person from the terminal to the SNS network address book The maintaining module 26 is configured to maintain the SNS network address book. For example, the maintaining module 26 may be configured to perform certain maintenance actions when receiving instructions from the user. When receiving a user instruction for a modification operation, the maintaining module 26 modifies the newly added (or synchronized) information of the contact person and stores the modified information in the SNS network address book. When receiving a user instruction for a deletion operation, the maintaining module 26 deletes the new added information that is not modified from the SNS network, while keeping the original information of the contact person or the newly added but modified information on the SNS network address book. Further, the pushing module 27 is configured to, when the information of the contact person is changed in the SNS network address book, push the changes on the information of the contact person in the SNS network address book to the terminal address book.

Figure 2:
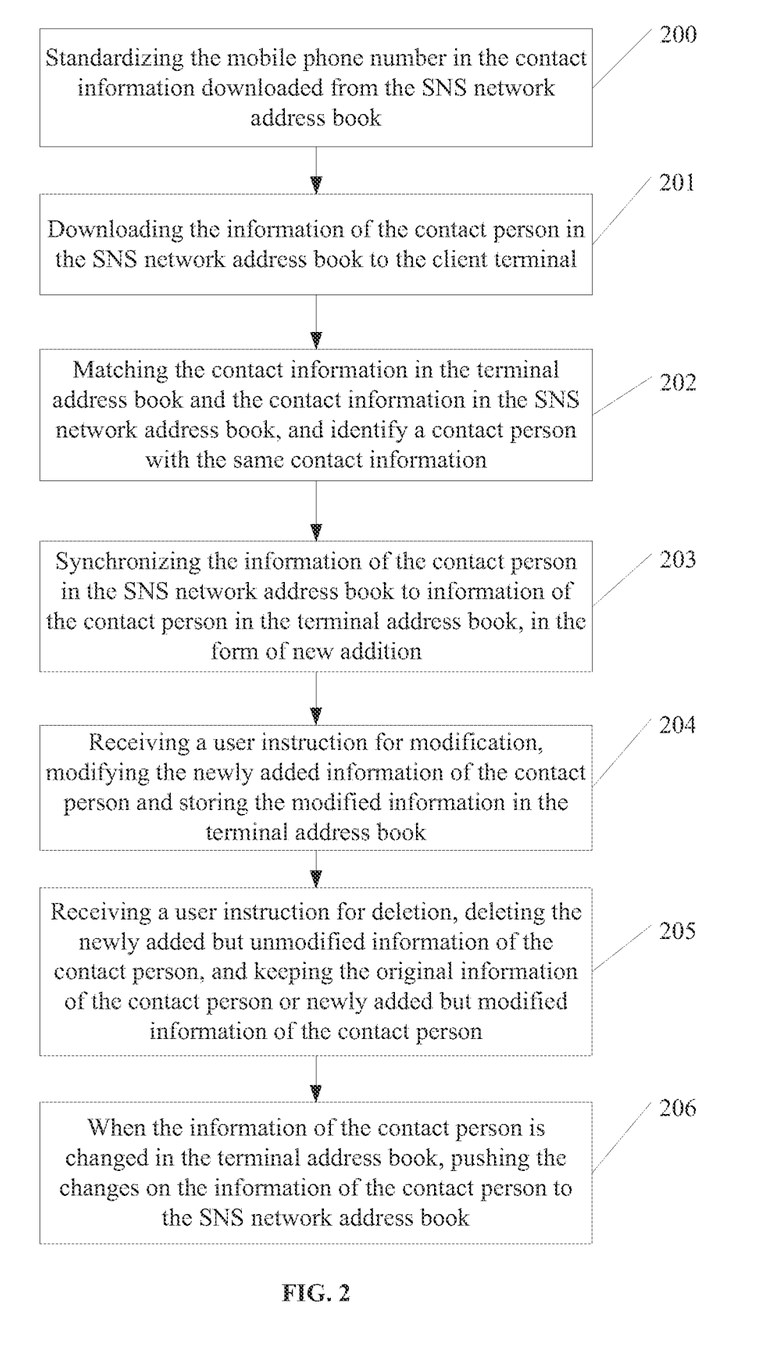
FIG. 2 illustrates another exemplary address book information synchronization process consistent with the disclosed embodiments.

In operation, both client terminal 806 (e.g., terminal synchronization system 400, terminal synchronization system 500) and server 804 (e.g., SNS network synchronization system 600, SNS network synchronization system 700) may perform various processes to synchronize and manage the terminal address book and the SNS network address book. FIG. 2 illustrates an exemplary synchronization process performed by client terminal 806.

As shown in FIG. 2, client terminal 806 (e.g., downloading module 15) may download contact information from the SNS network address book, and then may convert the downloaded contact information into a standardized format on client terminal 806 (e.g., processing module 14) (200). The downloading of the contact information may be started by a user of client terminal 806 or by client terminal 806 automatically or periodically. In other words, the synchronization process may be initiated by a user or automatically by the client terminal 806. For example, the client terminal 806 may provide the user with an interface to manage address books on client terminal 806 and on server 804, and the user may choose to synchronize the terminal address book with the SNS network address book.

The processing module 14 may access the SNS network using certain system interface to read contact information in the user's SNS network address book, and may also download the contact information to client terminal 806 via downloading module 15. Since the contact information such as mobile phone numbers may be in different formats, the processing module 14 may then convert the different format contact information in a standardized format, as shown in Table 1 below.

TABLE 1

Standardized format and processing rules

| Phone Number Type | Processing Rules |
|---|---|
| 11 digits, 11000000000 && <190000000000 | Directly read the 11 digit phone number |
| +86 (11-digit mobile phone number) | Remove +86 and read the 11-digit phone number |

TABLE 1-continued

Standardized format and processing rules

| Phone Number Type | Processing Rules |
|---|---|
| 17951 +1 +10 digits, "\"179511\d{10}\"", 17951 + mobile phone number | Remove 17951, read the 11-digit phone number |
| 17951 +0 +10 digits, "\"179510\d{10}\"", 17951 + area code + fixed telephone number | No processing |
| 3 digits - 4 digits - 4 digits, "\"\d{3}-\d{4}-\d{4}\"", or 1-d{3}-d{3}-d{4}, mobile phone number | Remove the "-", read the 11-digit phone number |
| 8 digit number beginning with 5/6/9 | Directly read the 8-digit number |
| 852 (8 digit number beginning with 5/6/9) | Remove the 852, read the 8-digit phone number |

Further, the client terminal 806 may also download information of contact person(s) in the SNS network address book to the client terminal 806 (201). The information may be downloaded in a data packet or message, which may include a plurality of fields. For example, Table 2 below shows various information fields used for synchronization operations and the suggested operations on these fields.

TABLE 2

Information field for synchronization operation

| Name of the information field | Notes on the suggested operation |
|---|---|
| Name | Synchronization: add the name as a name remark; New addition: add the name as a new entry of the person's name |
| Picture | Based on user setting to determine whether to sync |
| Mobile phone number | Standardize the mobile phone number |
| Email address | Recognize various types of email addresses |
| Fixed phone number | |
| Friend's personal home page | Extract the URL of the friend's personal home page, and add to the home page field of the local address book |
| Current address | |
| Company | Read the most recent company information |
| Job title | Read the job title information listed under the most recent company |
| Birthday | |
| IM information | Read information from Instant Messenger such as QQ and MSN, and add to the IM field of the address book |

Further, client terminal 806 (e.g., matching module 11, identifying module 12) may match the contact information in the terminal address book and the contact information in the SNS network address book, and identify a contact person with the same contact information (202). For example, the mobile phone numbers in the terminal address book may be matched against mobile phone numbers in the SNS network address book, and a contact person with the same mobile phone number in both address books may be identified as the contact person for synchronization. Or the email addresses in the terminal address book may be matched against the email addresses in the SNS network address book, and a contact person with the same email address in both address books may be identified as the contact person for synchronization. All contact persons having matching contact information in both address books may be identified.

After the contact person is identified, the client terminal 806 (e.g., synchronizing module 13) may synchronize the information of the contact person in the SNS network address book to the information of the contact person in the terminal address book, in the form of new addition (203). For example, the information of the contact person may include one or more of name, picture, mobile phone number, email address, landline number, URL of friend's personal home page, current residential address, company name, birthday, job title, and IM information, etc. Information of all identified contact persons may be synchronized.

After adding information of all contact persons having matching contact information in the terminal address book, client terminal 806 may obtain the information of the remaining contact persons in the SNS network address book and may prompt the user with a list of those contact persons together with their information. The user may be prompted to add any of the listed contact persons as a new contact to the terminal address book and to download the information of the newly added person from the SNS network to the terminal address book.

Alternatively, instead of downloading the information of contact person(s) in the SNS network address book in 201, the information of the contact person may be downloaded after the contact person is identified and only the information of the identified contact person may be downloaded.

In addition, the client terminal 806 (e.g., maintaining module 16) may receive a user instruction for modification, and may accordingly modify the newly added (or synchronized) information of the contact person and store the modified information in the terminal address book (204). The client terminal 806 (e.g., maintaining module 16) may also receive a user instruction for deletion, and may accordingly delete the newly added but unmodified information of the contact person while keep the original information of the contact person or the newly added but modified information of the contact person (205).

That is, after the synchronization is completed, the results of the synchronization may be prompted to the user, and the user may decide whether to modify and keep the newly added or synchronized information in the terminal address book. If the user wants to modify an entry of information, the user may issue a modification instruction; and if the user wants to delete an entry of information, the user may issue a deletion instruction.

Further, when the information of the contact person is changed in the terminal address book, the client terminal 806 (e.g., pushing module 17) may push the changes on the information of the contact person to the SNS network address book.

Figure 3:
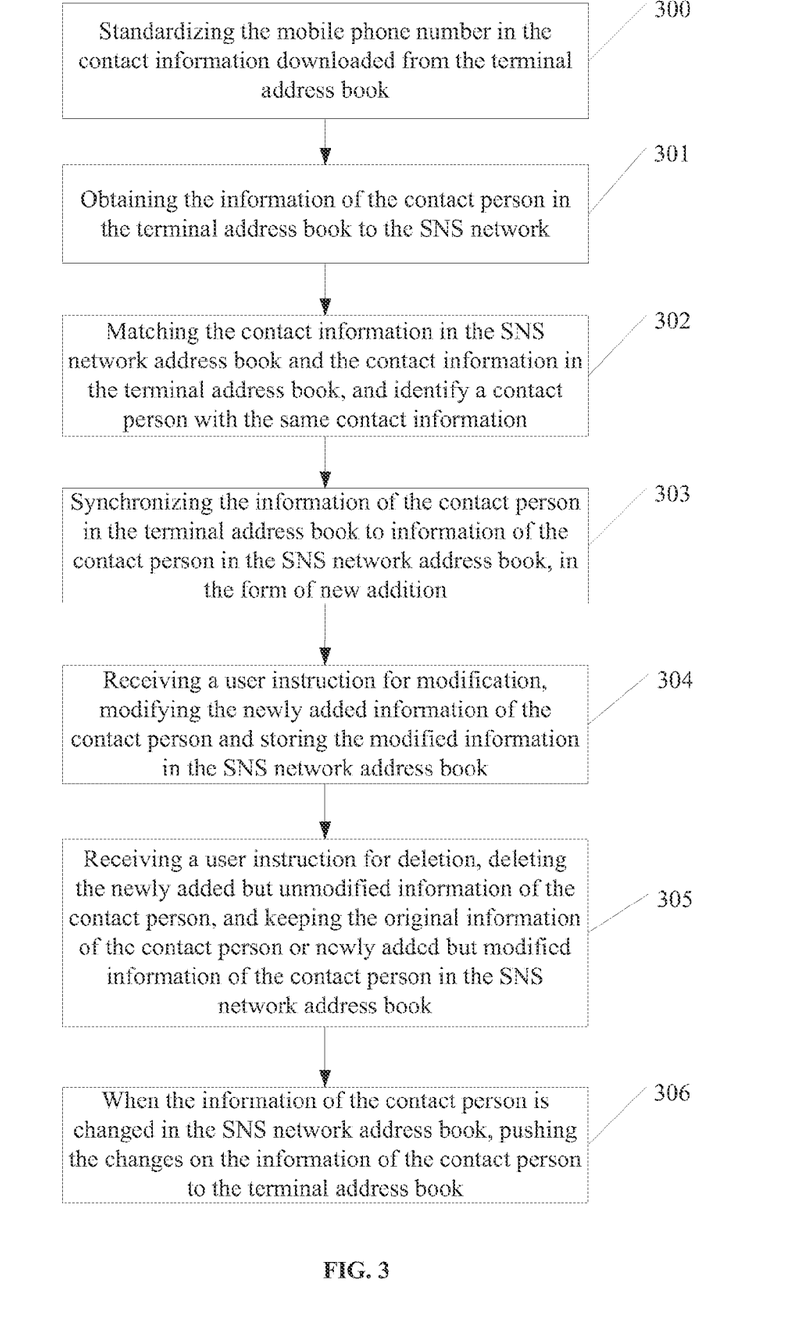
FIG. 3 illustrates another exemplary address book information synchronization process consistent with the disclosed embodiments.

As described above, the user may manage the terminal address book on client terminal 806 to synchronize or interoperate with the SNS network address book. The user may also manage the SNS network address book on server 804 to synchronize or interoperate with the terminal address book. FIG. 3 illustrates an exemplary synchronization process performed by server 804.

As shown in FIG. 3, server 804 (e.g., through obtaining module 25) may obtain contact information from the terminal address book, and convert the obtained contact information into a standardized format (e.g., through processing module 24) (300). Obtaining or standardization of the contact information may be started remotely by a user of client terminal 806. Alternatively, the obtaining or the standardization operation may be started automatically or periodically by client terminal 806 or by server 804. In other words, the synchronization process from the SNS network side may be initiated by a user or automatically by server 804 or client terminal 806.

The processing module 24 of server 804 may access the SNS network using certain system interfaces to read contact information from the terminal address book, and the contact information may be sent to the server 804 by the client terminal 806. After the contact information is obtained, the server 804 (e.g., processing module 24) may convert different format contact information into a standardized format, as previously shown in Table 1.

Further, the server 804 may also obtain other information of contact person(s) in the terminal address book from the client terminal 806 (301). The information may be uploaded to the SNS network in a data packet or message, which may include a plurality of fields as previously shown in Table 2.

The server 804 (e.g., matching module 21, identifying module 22) may match the contact information in the SNS network address book against the contact information in the terminal address book, and identify a contact person with the same contact information in both address books(302). For example, the mobile phone numbers in the SNS network address book may be matched against the mobile phone numbers in the terminal address book, and a contact person with the same mobile phone number in both address books may be identified as the contact person for synchronization operation. For another example, the email addresses in the SNS network address book may be matched against the email addresses in the terminal address book, and a contact person with the same email address in both address books may be identified as the contact person for synchronization. All contact persons having matching contact information in both address books may be identified.

After the contact person is identified, the server 804 (e.g., synchronizing module 23) may synchronize the information of the contact person in the terminal address book to the information of the contact person in the SNS network address book, in the form of new addition (303). As previously described, the information of the contact person may include one or more of name, picture, mobile phone number, email address, fixed phone number, friend's personal home page URL, residential address, company name, birthday, job title, and IM information, etc. Other information may also be used. Information of all identified contact persons may be synchronized.

After adding information of all contact persons having matching contact information in the SNS network address book, the server 804 may obtain the information of the remaining contact persons in the terminal address book and may prompt the user with a list of those contact persons together with their information. The user may be prompted to add any of the listed contact persons as a new contact to the SNS network address book and to upload the information of the newly added person from the terminal to the SNS network address book.

Alternatively, instead of uploading the information of contact person(s) from the terminal address book to the SNS network address book in 301, the information of the contact person may be uploaded after the contact person is identified and only the information of the identified contact person may be uploaded from the terminal address book.

In addition, the server 804 (e.g., maintaining module 26) may receive a user instruction for modification, and may accordingly modify the newly added (or synchronized) information of the contact person and store the modified information in the SNS network address book (304). The server 804 (e.g., maintaining module 26) may also receive a user instruction for deletion, and may accordingly delete the newly added but unmodified information of the contact person in the SNS network address book yet keep the original information of the contact person in the SNS network address book or the newly added but modified information (305).

That is, after the synchronization is completed, the results of the synchronization may be sent to the user, and the user may access the SNS network to decide whether to modify and keep the newly added or synchronized information in the SNS network address book. If the user wants to modify an entry of information, the user may issue a modification instruction; and if the user wants to delete an entry of information in the SNS network address book, the user may issue a deletion instruction.

Further, when the information of the contact person is changed in the SNS network address book, the server 804 (e.g., pushing module 27) may push the changes on the information of the contact person to the terminal address book.

Industrial Applicability and Advantageous Effects

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art.

The disclosed methods and systems can be used in a variety of internet applications, especially in social network services (SNS) applications. By using the disclosed methods and systems, a specific type or types of information (i.e., contact information) in the terminal address book and in the SNS network address book is matched to find any contact person with matching contact information. Information of the contact person in both address books can then be synchronized based on the matching result. Thus, the address book on the SNS network and the address book on the user terminal can be integrated and interoperable. Moreover, both address books can be managed in one-stop fashion. Thus, the user can manage the address book information with an improved efficiency.

What is claimed is:

1. A method for synchronizing between a first address book on a user terminal and a second address book on a social network service (SNS) network maintained by an SNS server containing at least a processor, comprising:
    determining, by the user terminal containing at least a processor, a synchronization target;
    when the synchronization target is determined as the first address book, downloading contact information from the second address book to the user terminal;
    when the synchronization target is determined as the SNS network address book, uploading, by the user terminal, contact information from the first address book to the SNS network;
    matching, by one of the user terminal and the SNS server, contact information in the first address book against contact information in the second address book;
    identifying, by one of the user terminal and the SNS server, based on the matching, a contact person having same contact information in the first address book and the second address book; and
    after the contact person is identified, synchronizing, by one of the user terminal and the SNS server, information of the contact person in the first address book and information of the contact person in the second address book;
    wherein before matching contact information in the first address book against contact information in the second address book, and when the contact information includes a phone number, the phone number is standardized according to one or more processing rules, including:
setting a predefined number of digits n for standardized mobile phone numbers;
if the phone number has n digits, directly reading the phone number as a standardized mobile phone number;
if the phone number includes more than n digits, reading the last n digits as a standardized mobile phone number; and
if the phone number includes at least one of parenthesis and dashes, removing the parenthesis and dashes, and only reading the n digits as a standardized mobile phone number wherein the synchronizing further includes:
if the synchronization target is the SNS network address book, synchronizing the information of the contact person in the terminal address book to the information of the contact person in the SNS network address book as a new addition; and
if the synchronization target is the terminal address book, synchronizing the information of the contact person in the SNS network address book to the information of the contact person in the terminal address book as a new addition;

wherein when the synchronization target is the SNS network address book,
after receiving a user instruction for modification, modifying newly added information of the contact person, and storing the modified information in the SNS network address book; and
after receiving a user instruction for deletion, deleting newly added information that is not modified from the SNS network address book, and keeping original information of the contact person in the SNS network address book or newly added but modified information in the SNS network address book; and wherein when the synchronization target is the terminal address book,
after receiving a user instruction for modification, modifying newly added information of the contact person, and storing the modified information in the terminal address book; and
after receiving a user instruction for deletion, deleting newly added information that is not modified from the terminal address book, and keeping original information of the contact person in the terminal address book or newly added but modified information in the terminal address book.

2. The method according to claim 1, wherein:
when the synchronization target is the SNS network address book,
if the information of the contact person is changed in the SNS network address book, pushing changes on the information of the contact person in the SNS network address book to the terminal address book, and
when the synchronization target is the terminal address book,
if the information of the contact person is changed in the terminal address book, pushing changes on the information of the contact person in the terminal address book to the SNS network address book.

* * * * *